US012401106B2

(12) United States Patent
Grävendieck

(10) Patent No.: US 12,401,106 B2
(45) Date of Patent: Aug. 26, 2025

(54) PHASE SHIFTER ASSEMBLY AS WELL AS ANTENNA FOR RADIOFREQUENCY SIGNALS

(71) Applicant: Telefonaktiebolaget LM Ericsson (publ), Stockholm (SE)

(72) Inventor: Jan Grävendieck, Rosenheim (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 140 days.

(21) Appl. No.: 18/551,017

(22) PCT Filed: Mar. 29, 2021

(86) PCT No.: PCT/EP2021/058113
§ 371 (c)(1),
(2) Date: Sep. 18, 2023

(87) PCT Pub. No.: WO2022/207063
PCT Pub. Date: Oct. 6, 2022

(65) Prior Publication Data
US 2024/0313378 A1 Sep. 19, 2024

(51) Int. Cl.
*H01P 1/18* (2006.01)
*H01P 5/16* (2006.01)

(52) U.S. Cl.
CPC ................ *H01P 1/184* (2013.01); *H01P 5/16* (2013.01)

(58) Field of Classification Search
None
See application file for complete search history.

(56) References Cited

U.S. PATENT DOCUMENTS

| | | | |
|---|---|---|---|
| 3,005,168 A | 10/1961 | Fye | |
| 3,146,413 A | 8/1964 | Butler | |
| 3,656,179 A | 4/1972 | De Loach | |
| 9,112,250 B1 * | 8/2015 | Tsironis | H01P 1/23 |
| 10,430,623 B1 * | 10/2019 | Pesavento | G06K 7/10316 |
| 2015/0372361 A1 * | 12/2015 | Abdellatif | H01P 1/182 333/135 |
| 2017/0117601 A1 | 4/2017 | Lindmark | |
| 2021/0175590 A1 * | 6/2021 | Raeesi | H01P 1/184 |

FOREIGN PATENT DOCUMENTS

| | | |
|---|---|---|
| JP | 202280804 A | 9/2022 |
| SU | 1094092 A | 5/1984 |
| SU | 1573482 A1 | 6/1990 |

OTHER PUBLICATIONS

International Search Report and Written Opinion dated Jan. 4, 2022 for International Application No. PCT/EP2021/058113 filed Mar. 29, 2021; consisting of 13 pages.

* cited by examiner

*Primary Examiner* — Wilson Lee
(74) *Attorney, Agent, or Firm* — Weisberg I.P. Law, P.A.

(57) ABSTRACT

A phase shifter assembly has a signal conductor, a ground conductor and a shifting device. The shifting device is movable with respect to the signal conductor, wherein the shifting device has an active section with a dielectric component and a passive section with a compensation component. The phase shifter assembly has a first impedance in the active section of the shifting device and a second impedance in the passive section of the shifting device, wherein the first impedance corresponds to the second impedance. The compensation component is spaced apart from the signal conductor in the first direction. Further, an antenna is shown.

22 Claims, 5 Drawing Sheets

PHASE SHIFTER ASSEMBLY AS WELL AS ANTENNA FOR RADIOFREQUENCY SIGNALS

CROSS-REFERENCE TO RELATED APPLICATION

This application is a Submission Under 35 U.S.C. § 371 for U.S. National Stage Patent Application of International Application Number: PCT/EP2021/058113, filed Mar. 29, 2021 entitled "PHASE SHIFTER ASSEMBLY AS WELL AS ANTENNA FOR RADIOFREQUENCY SIGNALS," the entirety of which is incorporated herein by reference.

TECHNICAL FIELD

The invention relates to a phase shifter assembly for radiofrequency signals as well as an antenna for radiofrequency signals.

BACKGROUND

Antennas having a phase shifter assembly to generate a phase shift between a plurality of signal outputs are widely known. It is known to use phase shifters with a movable dielectric material to achieve the desired phase shift.

For example, U.S. Pat. No. 3,005,168 shows a phase shifter assembly with an inner conductor between two outer grounding plates. The outer grounding plates are a rotatable with respect to the inner conductor. Two regions are provided with different distances between the inner conductor in the outer grounding plates. In the region with a larger distance, a dielectric is provided to generate a delay.

Further, U.S. Pat. No. 3,656,179 shows a phase shifter assembly with a multilayer PCB technology. A movable element comprises two different dielectrics, a step in height and one conductive element facing the signal conductor attached to one of the dielectrics. Further, the conductive element is in physical contact with the signal conductor.

Both solutions are complex and large as a multilayer PCB or rotatable outer grounding plates are difficult to manufacture and are only reliable at low frequencies. At higher frequencies the change in geometry itself represents a discontinuity which is a source for reflections.

SUMMARY

Thus, it is the object of the invention to provide a phase shifter assembly and an antenna which are small in size and provide a high signal quality.

For this purpose, a phase shifter assembly for radio frequency signals, in particular mobile communication signals is provided. The phase shifter assembly having a signal conductor, a ground conductor spaced apart from the signal conductor in a first direction and a shifting device. The shifting device is movable with respect to the signal conductor in and against a direction of motion. The shifting device comprises at least one active section having at least one dielectric component and at least one passive section having at least one compensation component, wherein the active section and the passive section are arranged one after the other in the direction of motion. The dielectric component in the active section and the compensation component in the passive section are arranged between the signal conductor and the ground conductor. The phase shifter assembly has a first impedance in the active section of the shifting device and a second impedance in the passive section of the shifting device, wherein the first impedance corresponds to the second impedance. The compensation component is spaced apart from the signal conductor in the first direction.

By providing an active section and a passive section with the same impedance, a small and reliable phase shifter assembly is provided that is easy to manufacture and does not require complex impedance matching. It has been realized that providing a compensation element in a distance to the signal conductor reduces the diameter relevant for the impedance and, at the same time, improves the signal quality. As contact between two plate-like conductors is avoided, micro sparks do not occur which would be a source of intermodulation.

The dielectric component may also be spaced apart from the signal conductor in the first direction.

In particular, corresponding impedances are equal to one another.

The direction of motion is, for example, perpendicular to the first direction. Further, the shifting device is movable with respect to ground conductor and/or the signal conductor.

For example, in the passive section the at least one compensation component, the corresponding region of the signal conductor and the corresponding region of the ground conductor form a first wave guide section of the phase shifter assembly having the first impedance, and in the active section the at least one dielectric component, the corresponding region of the signal conductor and the corresponding region of the ground conductor form a second wave guide section of the phase shifter assembly having the second impedance.

Further, the width of the dielectric component and/or of the compensation component in a direction perpendicular to the first direction and perpendicular to the direction of motion may be at least the width of the signal conductor.

For example, the thickness of the dielectric component in the first direction is larger than the thickness of the compensation component in the first direction so that the size of the phase shifter assembly in the first direction depends only on the thickness of the dielectric component.

In an embodiment of the invention, the compensation component comprises at least two subcomponents which are spaced apart from one another in the direction of motion. This way, unwanted resonances are avoided reliably.

For example, the subcomponents of the same passive section are located at the same side of the active section in the direction of motion.

In an aspect of the invention, the distance between the subcomponents in the direction of motion is smaller than a quarter, in particular an eighth of the smallest wavelength of the signals within the frequency band of the phase shifter assembly; and/or wherein the length of the subcomponents in the direction of motion is smaller than half, in particular a quarter of the wavelength of the smallest wavelength of the signals within the frequency band of the phase shifter assembly. This way, unwanted resonances are reduced even further.

The largest dimension of the subcomponents may be smaller than half, in particular a quarter of the wavelength of the smallest wavelength, in order to avoid any resonances.

In an embodiment of the invention, the signal conductor and the ground conductor are provided on opposite sides of a support, in particular wherein the signal conductor and the ground conductor form a microstrip line leading to a simple design.

The ground conductor may be the ground plane of the signal conductor and/or the support may be a circuit board.

The support with the ground conductors may be a Molded Interconnect Device (MID) and/or manufactured using techniques like Lase Direct Structuring (LDS).

In an embodiment of the invention, the phase shifter assembly comprises a first ground conductor and a second ground conductor, wherein the signal conductor is arranged between the first and second ground conductor in the first direction, in particular wherein the signal conductor and the first and second ground conductors form a stripline providing a well-understood wave propagation.

The first and second ground conductor may be the ground planes for the signal conductor.

For example, the first ground conductor and/or the second ground conductor is stationary with respect to the signal conductor or movable with respect to the signal conductor, in particular being a part of the shifting device.

The second ground conductor may be part of the housing of the shifting device, e.g. the housing comprises a metal layer or is made from a metal.

In another aspect, the active section of the shifting device comprises a first dielectric component and a second dielectric component, wherein the passive section of the shifting device comprises a first compensation component and a second compensation component, wherein the first dielectric component and the first compensation component are arranged between the signal conductor and the ground conductor, in particular the first ground conductor, and wherein the second dielectric component and the second compensation component are arranged on the opposite side of the signal conductor than the first dielectric component and the first compensation component, in particular between the signal conductor and the second ground conductor. This way, the delay of the signal transmitted by the signal conductor can be delayed more efficiently, further reducing the size necessary for the phase shifter assembly.

For shielding the signal conductor effectively, the signal conductor may comprise a delay section extending in the direction of motion, wherein the at least one active section and the at least one passive section cover the delay section over its entire length, in particular in any position of the shifting device.

The delay section may run in a straight line, in windings, meanders and/or in zig-zag. In addition or alternatively, the delay section may also comprise notches at one or two sides of the conductor.

In another embodiment, the shifting device comprises two active sections and one passive section, wherein the passive section is located between the active sections in the direction of motion, or wherein the shifting device comprises two passive sections and one active section, wherein the active section is located between the passive sections in the direction of motion. These arrangements reduce the size of the phase shifter assembly even further.

In an aspect of the invention, the signal conductor comprises an input portion and at least two branch portions emerging from the input portion at a junction, in particular in the delay section, wherein the branch portions extend from the junction in opposite directions in the direction of motion. This way, a phase shifter assembly with more outputs than inputs can be provided with a small size.

For example, each branch portion constitutes an output portion connected to an output of the phase shifter assembly.

In an aspect, the junction is provided as a Wilkinson power splitter comprising two arms and a resistor, wherein the arms extend from the input portion and are connected to one of the branch portions each, and wherein the resistor galvanically couples the arms at the point or region the arms merge with the respective branch portion. Wilkinson power splitters improve the matching in the case of different impedances or different complex voltages at the branch portions and/or arms. This improves the matching at different settings of the variable phase shifter.

For example, each of the arms has a length of a quarter of a wavelength between the input portion and the resistor.

The arms may form a circular or racetrack shape.

In order to reduce the number of phase shifters needed, the phase shifter assembly may comprise two signal conductors, the signal conductors being aligned parallel or antiparallel with respect to the direction of motion.

For example, the signal conductors may lie in the same plane perpendicular to the first direction.

In an embodiment of the invention, the shifting device is configured to move linearly and the direction of motion being a straight line, in particular wherein the shifting device has a cuboid shape. This design allows the construction of very slim phase shifter assemblies.

In another embodiment of the invention, the shifting device is configured to rotate around an axis of rotation in the first direction, and the direction of motion being the peripheral direction around the axis of rotation, in particular wherein the shifting device has a disk shape. This design reduces the length of the phase shifter assembly.

In order to reduce the number of actuators, the phase shifter assembly may comprise at least two shifting devices, wherein the shifting devices are mechanically coupled such that the shifting devices move simultaneously, in particular synchronously in the same or in opposite directions.

In an aspect of the invention, the compensation component, in particular the subcomponents, is made out of a conductive material, in particular metal, and/or the compensation component is coupled to the ground conductor and/or the signal conductor galvanically or capacitively. By using a conductive material, the effective size and thus the impedance of the resulting waveguide section is reduced.

In an embodiment, the shifting device comprises a non-conductive support body, wherein the compensation component, in particular the subcomponents, are provided as a thin layer of conductive material applied the support body. This way, the compensation components may be manufactured cost efficiently.

For example, the compensation component, in particular each of the subcomponents, are formed by two layers of conductive material on opposite sides of the support body.

The two layers may be connected by at least one via extending through the support body. The via may be at the border of the respective subcomponent in the direction of motion.

The support body may be of a PCB material.

In an aspect, the support body holds the dielectric component so that a single support body for the dielectric component and the compensation component suffices.

For above purpose, an antenna is further provided, comprising at least one phase shifter assembly as discussed above, in particular wherein the antenna comprises at least one connection line galvanically connected to the signal conductor of the phase shifter assembly, wherein the impedance of the at least one connection line corresponds to the first and second impedance of the phase shifter assembly.

The features and advantages discussed with respect to the phase shifter assembly also apply to the antenna and vice versa.

BRIEF DESCRIPTION OF THE DRAWINGS

Further features and advantages will be apparent from the following description as well as the accompanying drawings, to which reference is made. The drawings show in detail.

DETAILED DESCRIPTION

Figure 1:
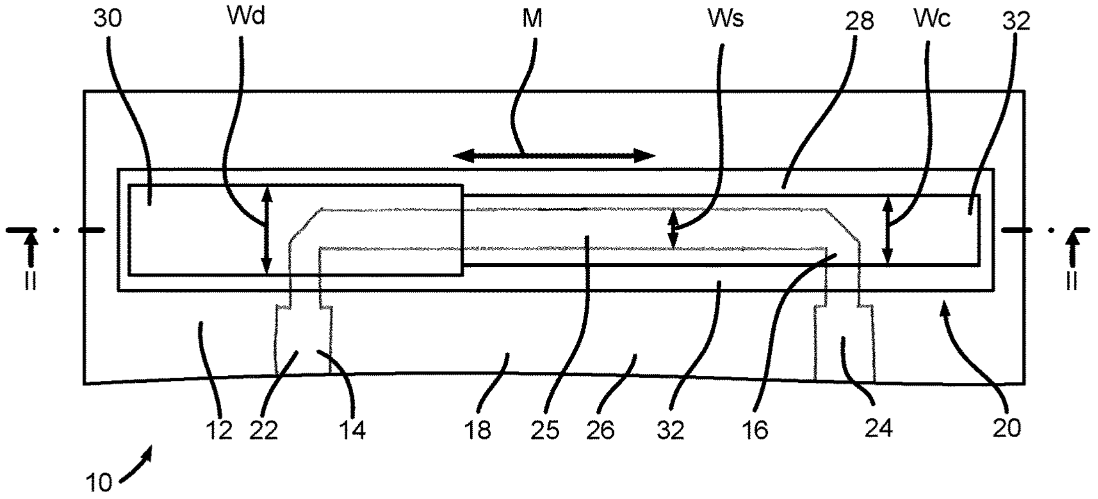
FIG. 1: a very schematic drawing of a part of an antenna according to a first embodiment of the invention with a phase shifter assembly according to a first embodiment of the invention.

FIG. 1 shows a portion of a radio frequency mobile communication antenna 10 very schematically. The antenna 10 may be configured to be used for electromagnetic radiation having frequencies between 0.5 GHz and 5 GHz, in particular between 0.5 GHz and 3.5 GHz.

The antenna 10 is, for example, a radio frequency mobile communication antenna used in mobile communication base stations. In particular, the radio frequency mobile communication antenna 10 is not an antenna used for radar applications.

The portion of the antenna 10 shown in FIG. 1 includes a phase shifter assembly 12, for example as part of a signal distribution network of the antenna 10, and connection lines 14, for example for guiding radiofrequency signals.

The connection lines 14 have an impedance Z3 and may be provided as microstrip lines.

The phase shifter assembly 12 comprises a signal conductor 16, a ground conductor 18 (FIG. 2), a shifting device 20, at least one input 22 and at least one output 24. The delay section 25 has a length Lds in the direction of motion M.

The at least one input 22 and the at least one output 24 are galvanically connected to each other by the signal conductor 16 and to other parts of the antenna 10 by a connection lines 14.

The signal conductor 16 comprises a delay section 25, which accounts for the majority, in particular more than 80% of the signal conductor 16 between the input 22 and the output 24.

In the first embodiment, the phase shifter assembly comprises one input 22 and one output 24. Further, the delay section 25 is a straight portion of the signal conductor 16.

Figure 2:
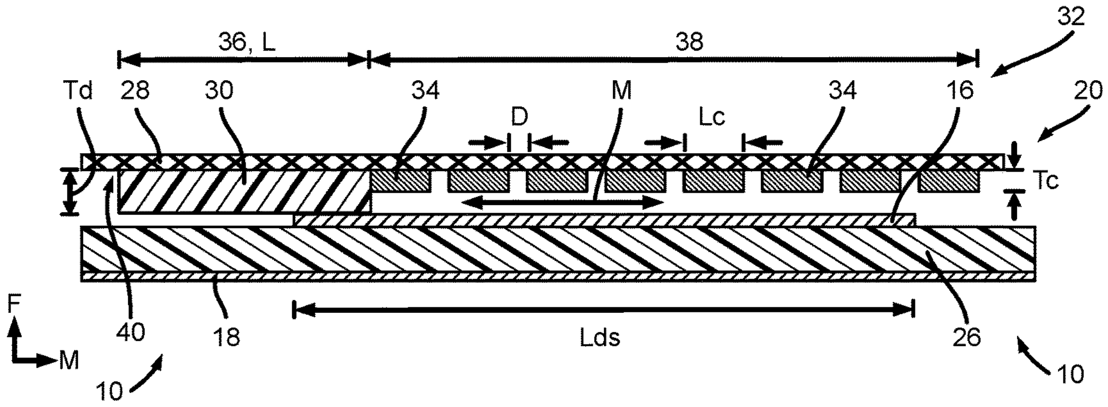
FIG. 2: a cross section along the line II-II of FIG. 1.

FIG. 2 shows a cross-section of the antenna 10 of the region of the phase shifter assembly 12 in more detail.

The signal conductor 16 and the ground conductor 18 are provided on opposite sides of a support 26, for example a circuit board of the phase shifter assembly 12. The signal conductor 16, the ground conductor 18 and the support 26 form a microstrip line as known in the art.

As such, the signal conductor 16 and the ground conductor 18 are spaced apart in the first direction F of the phase shifter assembly 12. The first direction F may also be regarded as the height direction or z-direction.

The ground conductor 18 may cover the majority or entirety of its side of the support 26, and thus being a ground plane for the signal conductor 16.

The shifting device 20 comprises a housing 28, a dielectric component 30 and a compensation component 32, in the first embodiment, the shifting device 20 has a cuboid shape.

The housing 28 with the dielectric component 30 and the compensation component 32 is arranged above the signal conductor 16 in the first direction F and covers the delay section 25, in particular entirely.

Further, the shifting device 20, more precisely the housing 28 with the dielectric component 30 and the compensation components 32 are movable with respect to the signal conductor 16 in and, of course, against a direction of motion M, which is perpendicular to the first direction F.

The direction of motion M corresponds to the direction of the largest dimension of the delay section 25. In other words, the direction of motion M and the delay section 25 run parallel to each other.

In the first embodiment, the delay section 25 extends in a straight line so that the direction of motion M is a straight line. Thus, the shifting device 20 is movable linearly.

The housing 28 may be made of plastics, the dielectric material of the dielectric component 30 or metal. In the latter case, the housing 28 itself functions as a second ground conductor 40, which may be coupled galvanically or capacitively to the first ground conductor 18 or otherwise grounded.

Of course, the shifting device 20 may comprise a dedicated metallic layer functioning as a second ground conductor 40.

The dielectric component 30 and the two compensation components 32 are fixed to the housing 28. In the direction of motion M, the dielectric component 30 in the compensation components 32 are arranged one behind the other as apparent from FIG. 2.

The section of the shifting device 20 in the direction of motion M comprising the dielectric component 30 constitutes an active section 36 and the section comprising the compensation component 32 constitutes a passive section 38.

The active section 36 and the passive section 38 cover the delay section 25 over its entire length Lds.

Further, the dielectric component 30 and the compensation component 32 are arranged on the same side of the signal conductor 16 in the first direction F.

The dielectric component 30 is a block of dielectric material arranged between the housing 28 (and the optional second ground conductor 40) and the signal conductor 16. The dielectric component 30 having a thickness Td in the first direction F, a length Ld in the direction of motion M and a width Wd in the direction perpendicular to the direction of motion M and to the first direction F.

The compensation component 32 is also arranged between the housing 28 (and the optional second ground conductor 40) and the signal conductor 16.

The compensation component 32 comprises a plurality of subcomponents 34 being arranged one after the other in the direction of motion M and spaced apart by a distance D in the direction of motion M. For ease of reference, the distance D is considered part of the compensation component 32.

The subcomponents 34 may be of a conductive material, in particular metal. For example, the subcomponents 34 are galvanically or capacitively connected to the ground of the antenna 10. This grounding could be achieved by a galvanic or capacitive connection between the subcomponents 34 and the ground conductor 18, 40. Alternatively or in addition the subcomponents 34 are galvanically or capacitively coupled to the signal conductor 16.

Further, analog to the dielectric component 30, the compensation component 32, and thus the subcomponents 34 have a thickness Tc in the first direction F and a width Wc in the direction perpendicular to the first direction F and the direction of motion M.

The distance D between two adjacent subcomponents 34 is smaller than a quarter, in particular in eighth of the smallest wavelengths of the signals within the frequency band the phase shifter assembly 12 is designed to operate in.

The distance D may be larger than the thickness of the ground conductor 18.

The length Lc of each of the subcomponents 34 in the direction of motion M is smaller than half, in particular a quarter of the smallest wavelength of the signals within the frequency band the phase shifter assembly 12 is designed to operate in.

For example, each dimension of the subcomponents 34 is smaller than half, in particular a quarter of the smallest wavelength of the signals within the frequency band the phase shifter assembly 12 is designed to operate in.

The width Wd of the dielectric component 30 and the width Wc of the compensation component 32 and its subcomponents 34 is equal or larger than the width Ws of the signal conductor 16.

The thickness Td of the dielectric component 30 is larger than the thickness Tc of the compensation component 32 and its subcomponents 34.

In the first direction F, the dielectric component 30 is in contact with the signal conductor 16, and the compensation component 32 is spaced apart from the signal conductor 16. It is also possible, that the dielectric component is spaced apart from the signal conductor 16.

In the active section 36, the dielectric component 30, the corresponding region of the signal conductor 16, the corresponding region of the ground conductor 18 and optionally the corresponding region of the second ground conductor 40 form a first waveguide section of the phase shifter assembly. This first waveguide section has a first impedance Z1.

Likewise, in the passive section 38, the dielectric component 30, the corresponding region of the signal conductor 16, the corresponding region of the ground conductor 18 and optionally the corresponding region of the second ground conductor 40 form a second waveguide section of the phase shifter assembly. This second waveguide section has a second impedance Z2.

The material, thicknesses Td, Tc and locations in the first direction F of the dielectric component 30 and the compensation component 32, as well as any other characteristic of the phase shifter assembly 12 are chosen such that the first impedance Z1 and the second impedance Z2 correspond to each other, in particular are equal to one another.

Further, the first and second impedance Z1, Z2 correspond to the impedance Z3 of the connection lines 14, in particular Z1=Z2=Z3.

Even though the impedances Z1, Z2 of the active section 36 and the passive section 38 are equal, the radiofrequency signals traveling through the active section 36 and the passive section 38 have different propagation velocities due to the presence of the dielectric material. Thus, the delay of the radiofrequency signal picked up over the entire length Lds of the delay section 25 depends on the size of the overlap of the active section 36 with the delay section 25 of the signal conductor 16 as the propagation velocity is reduced by the dielectric component 30.

The overlap of the active section 36 with the delay section 25 can be adjusted by moving the shifting device 20 in the direction of motion M.

For example, in the situation shown in FIG. 2, only a small portion of the active section 36 overlaps with the delay section 25. If the shifting device 20 and with that the dielectric component 30 in the compensation component 32 are moved to the right in the direction of motion M, the overlap between the active section 36 and the delay section 25 increases. This in turn leads to a larger delay and with that a larger phase shift along the delay section 25.

The length Ld of the dielectric component 30 may be chosen such that if the active section fully overlaps with the delay section 25, a phase shift of 180° is achieved with respect to the situation with no overlap between the active section 36 and the delay section 25.

The shifting device 20 may be moved between a position with no overlap of the active section 36 and the delay section 25, i.e. a full overlap of the delay section 25 with the passive section 38, and a position with full overlap of the active section 36 and the delay section 25. In the latter position, an overlap between the passive section 38 and the delay section 25 may still exist.

Thus, the phase shifter assembly 12 is small in size and easy to manufacture due to the small number of layers of the shifting device 20. At the same time, the impedance of the phase shifter assembly 12 does not change regardless of the position of the shifting device 20 and thus the phase shift achieved by the phase shifter assembly 12. Thus, no complex impedance matching has to be performed.

In the following, further embodiments of the invention are described in detail. The embodiments correspond substantially to the first embodiment discussed with respect to FIGS. 1 and 2 so that only the differences are discussed in the following. The same and functionally the same components are labeled with the same reference signs.

FIG. 2 shows a second embodiment of the antenna 10 and the phase shifter assembly 12 in a cross-section which corresponds to the cross-section of FIG. 2.

In this second embodiment, the signal conductor 16 is not supported by the support 26 in the region of the phase shifter assembly 12. Instead, the phase shifter assembly 12 comprises the ground conductor 18, called first ground conductor in the following, and a second ground conductor 40.

The signal conductor 16 is provided between the first ground conductor 18 and the second ground conductor 40 in the first direction F, forming a stripline as known in the art. The first ground conductor 18 and the second ground conductor 40 may be regarded as ground planes for the signal conductor 16.

Further, in this second embodiment, the phase shifter assembly 12 comprises two dielectric components 30, namely a first dielectric component and a second dielectric component, and two compensation components 32 namely a first compensation component and a second compensation component.

With respect to the first direction F, the first dielectric component 30 and the first compensation component 32 are arranged between the signal conductor 16 and the first ground conductor 18. The second dielectric component 30 and the second compensation component 32 are arranged between the signal conductor 16 and the second ground conductor 40.

In other words, the first dielectric component 30 and the first compensation component 32 are located on one side of this signal conductor 16 and the second dielectric component 30 and the second compensation component 32 are arranged on the other side of the signal conductor 16.

The second ground conductor 40 may be stationary with respect to the signal conductor 16. Alternatively, the second ground conductor 40 may be movable in the direction of motion M with respect to the signal conductor 16 as a part of the shifting device 20.

Needless to say, the first and second dielectric component 30 as well as the first and second compensation component 32 are movable in the direction of motion M with respect to the signal conductor 16 as part of the shifting device 20.

Figure 4:
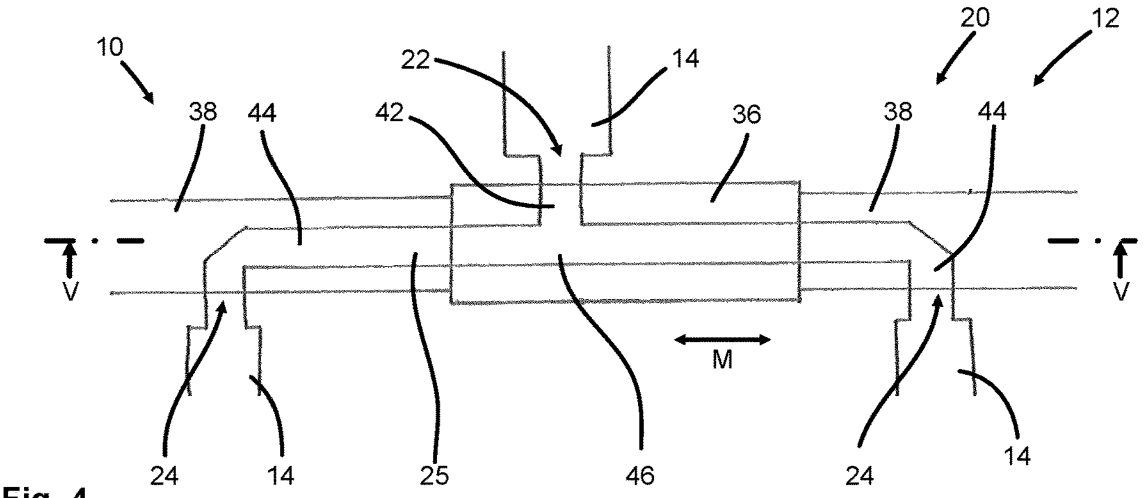
FIG. 4: a very schematic drawing of a part of an antenna according to a third embodiment of the invention with a phase shifter assembly according to a third embodiment of the invention.
Figure 5:
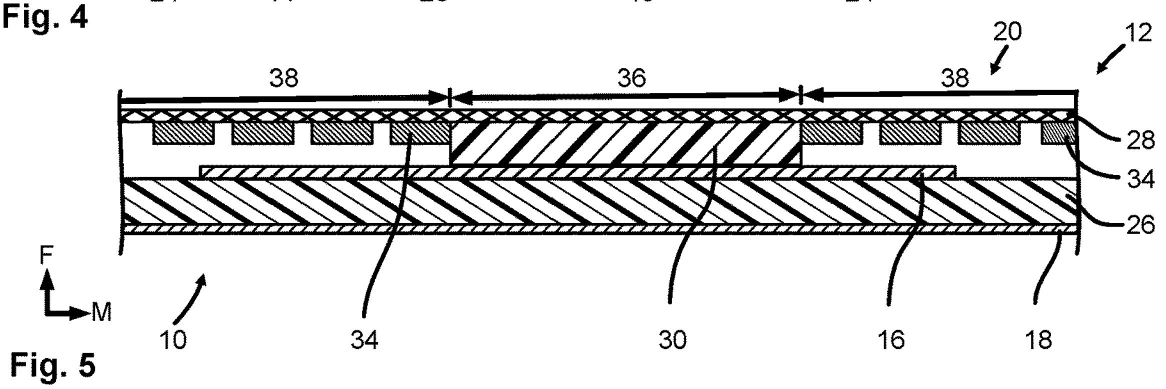
FIG. 5: a cross section along the line V-V of FIG. 4.

FIGS. 4 and 5 show a third embodiment of the antenna 10 with the phase shifter assembly 12. The views of FIGS. 4 and 5 correspond to the views of FIGS. 1 and 2, respectively.

In this third embodiment, the phase shifter assembly 12 is a linear, differential phase shifter having one input 22 and two outputs 24. To this end, the signal conductor 16 has an input portion 42 extending from the input 22 and branches into two branch portions 44 which are each connected with one of the outputs 24.

The input portion 42 and the branch portions 44 merge at a junction 46, which is in the region of the delay section 25, in particular in the middle of the delay section 25 with respect to the direction of motion M.

From the junction 46, the branch portions 44 extend in opposite directions with respect to the direction of motion M.

In this third embodiment, the shifting device 20 comprises two passive sections 38 and one active section 36. The active section 36 is arranged between the passive sections 38 and the direction of motion M.

The active section 36 is arranged above the junction 46 in the position of the shifting assembly 12 in which no phase shift between the radiofrequency signals at the outputs 24 is desired.

As can be seen in FIG. 5, the structure of the active section 36 and the passive sections 38 are identical to the active section 36 and the passive section 38 of the first embodiment.

Figure 3:
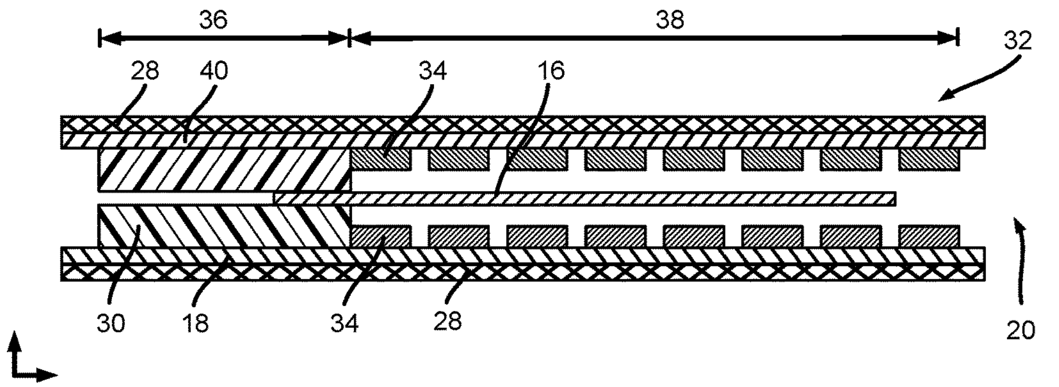
FIG. 3: a cross section corresponding to line II-II of FIG. 1 of an antenna and a phase shifter assembly according to a second embodiment of the invention.

Of course, the active section 36 and the two passive sections 38 may also be constructed as in the second embodiment shown in FIG. 3.

With the phase shifter assembly 12 according to this third embodiment, a differential phase shifter is constructed easily.

Figure 6:
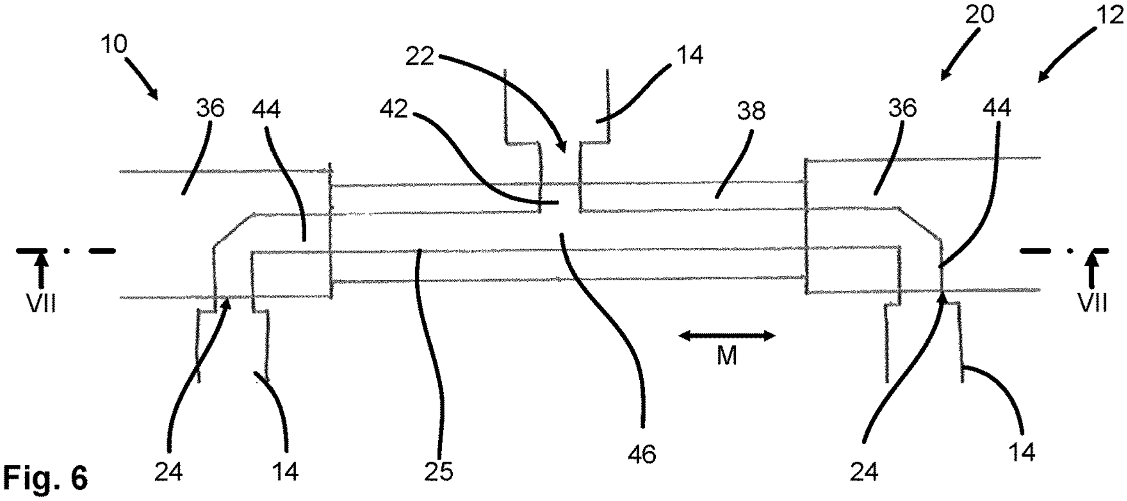
FIG. 6: a very schematic drawing of a part of an antenna according to a fourth embodiment of the invention with a phase shifter assembly according to a fourth embodiment of the invention.
Figure 7:
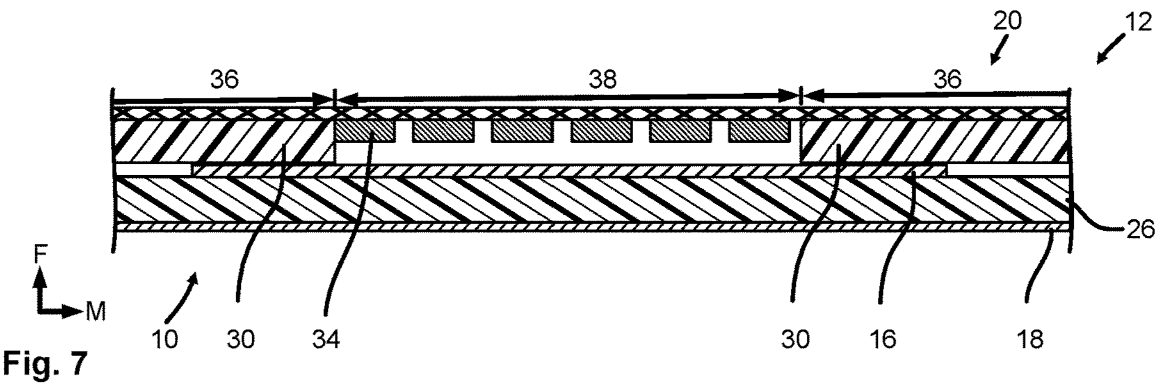
FIG. 7: a cross section along the line VII-VII of FIG. 6.

FIGS. 6 and 7 show a fourth embodiment of the antenna 10 and the phase shifter assembly 12 which corresponds closely to the third embodiment. The views of FIGS. 6 and 7 correspond to the views of FIGS. 4 and 5, respectively.

In the fourth embodiment, only one passive section 38 but two active sections 36 are provided in the shifting device 20. The passive section 38 is arranged between the two active section 36 in the direction of motion M.

In this embodiment, the passive section 38 is arranged above the junction 46 in the position of the shifting assembly 12 in which no phase shift between the radiofrequency signals at the outputs 24 is desired.

Figure 8:
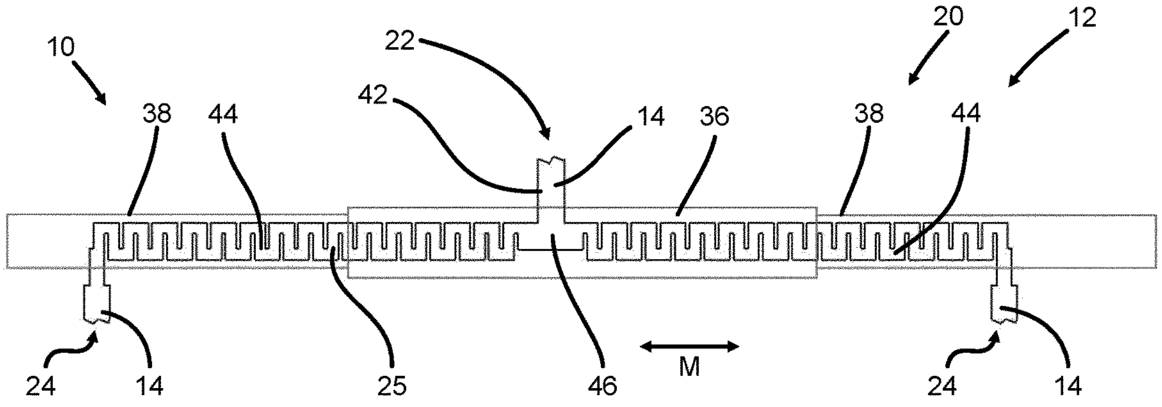
FIG. 8: a very schematic drawing of a part of an antenna according to a fifth embodiment of the invention with a phase shifter assembly according to a fifth embodiment of the invention.

FIG. 8 shows a fifth embodiment of an antenna 10 with a phase shifter assembly 12 in a view corresponding to FIG. 4 or 6.

In this fifth embodiment, the delay section 25 of the signal conductor 16 does not run in a straight line but in windings or meanders. It is of course also possible that the delay section 25 runs in zig-zag and/or that notches are provided at one or two sides of the delay section 25 as is known in the art.

The winding-, meander- or zig-zag-course and/or notches of this embodiment may of course also be used in any other embodiment of this disclosure.

Figure 9:
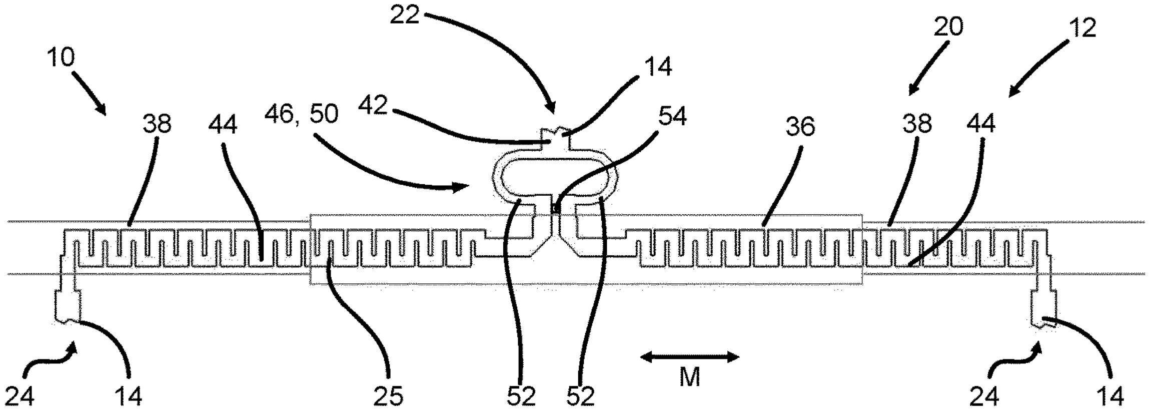
FIG. 9: a very schematic drawing of a part of an antenna according to a sixth embodiment of the invention with a phase shifter assembly according to a sixth embodiment of the invention.

FIG. 9 shows a sixth embodiment of an antenna 10 with a phase shifter assembly 12 in a view corresponding to FIG. 4, 6 or 8.

In this sixth embodiment, the way the input portion 42 splits into the branch portions 44 differs from the previous embodiments.

The junction 46 is partly provided as a Wilkinson power splitter 50. The Wilkinson power splitter 50 comprises two arms 52 and a resistor 54.

The arms 52 extend from the input portion 42 and are connected to one of the branch portions 44 each.

Each of the arms 52 has a length of a quarter of a wavelength between the input portion 42 and the resistor 54, which galvanically couples the arms 54 at the point or region where they merge with the respective branch portion 44.

The arms 52 may form a circular or racetrack shape as can be seen in FIG. 9.

Figure 10:
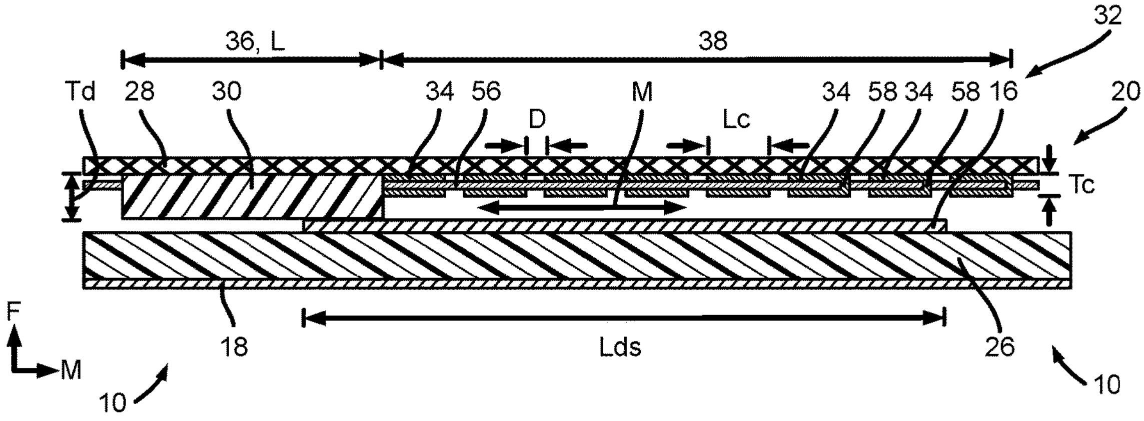
FIG. 10: a very schematic cross section of a part of an antenna according to a seventh embodiment of the invention with a phase shifter assembly according to a seventh embodiment of the invention.

FIG. 10 shows a seventh embodiment of an antenna 10 with a phase shifter assembly 12 in a view corresponding to FIG. 2.

In this embodiment, the shifting device 20 comprises a support body 56 made of a non-conductive material, for example a PCB material.

The support body 56 supports the dielectric component 30, i.e. the dielectric component 30 is attached to the support body 56.

Further, the support body 56 supports the compensation component 32, more precisely the subcomponents 34.

This this embodiment, the subcomponents 34 are thin layers of a conductive material that are applied to both of the opposite sides of the support body 56.

Thus, each of the subcomponents 34 is formed by the conductive material applied to both sides.

Further, vias 58 of conductive material that extend through the support body 56 in the first direction F connect the layers at both sides.

In the shown embodiment, the vias 58 are located at the borders of the subcomponents 34 in the direction of motion M, wherein only the vias 58 of the three subcomponents 34 at the right-hand side are shown for sake of simplicity.

Figure 11:
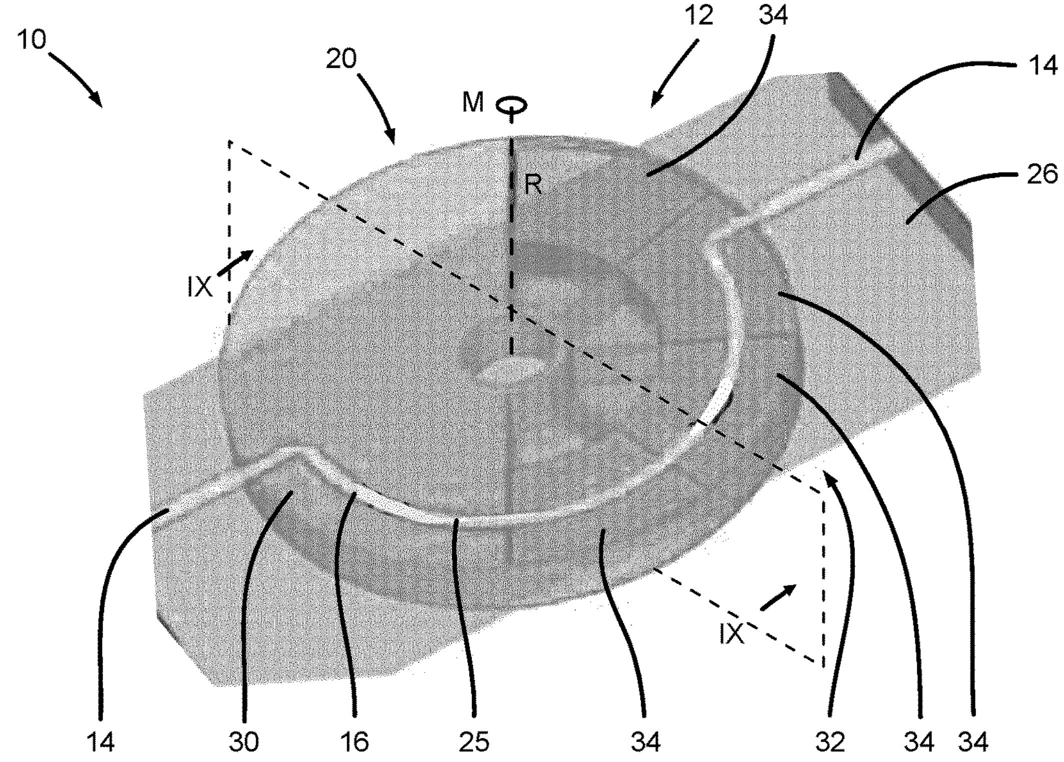
FIG. 11: a very schematic drawing of a part of an antenna according to a eighth embodiment of the invention with a phase shifter assembly according to a eighth embodiment of the invention.
Figure 12:
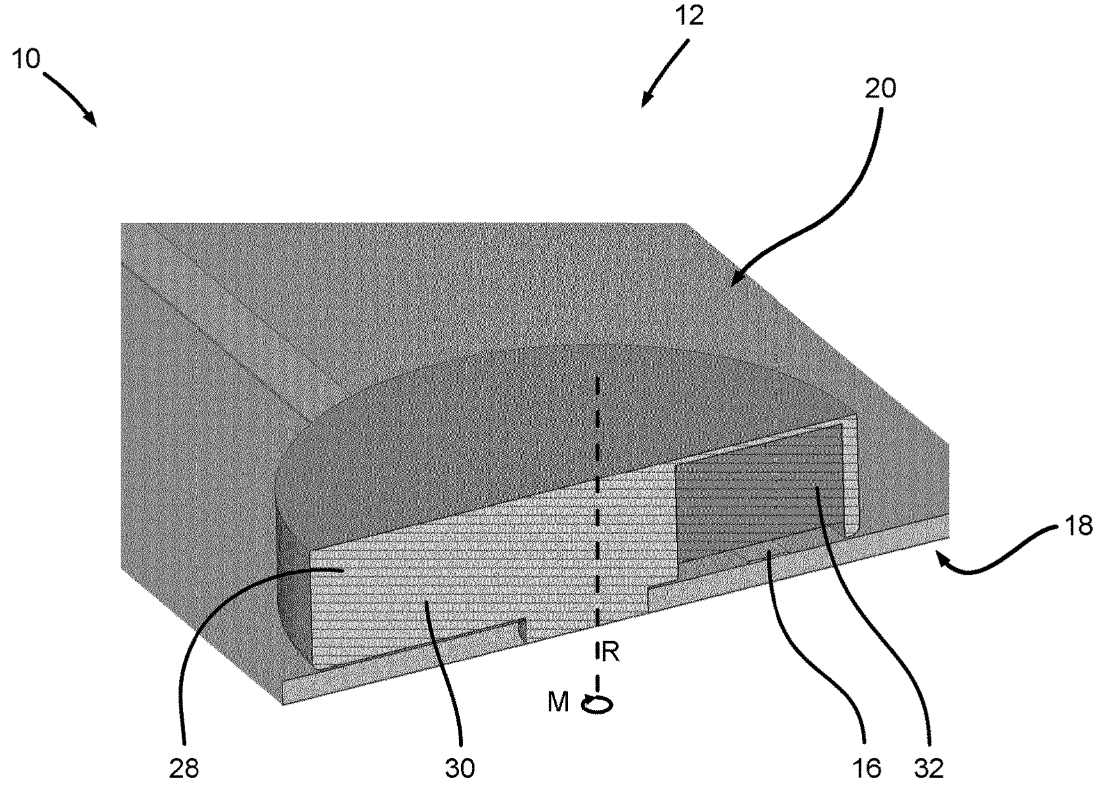
FIG. 12: a cross section along the plane IX-IX of FIG. 11.

FIGS. 11 and 12 show an eighth embodiment of an antenna 10 with a phase shifter assembly 12.

In this embodiment, the linear motion of the shifting device 20 of the previous embodiments is a rotational motion in this eighth embodiment.

The shifting device 20 is movable, i.e. rotatable around a rotational axis R extending in the first direction F so that the direction of motion M is to be seen as the peripheral direction around the rotational axis R.

The first direction F is the direction perpendicular to the plane of motion or in other words, the axial direction with respect to the rotational axis R.

The delay section 25 of the signal conductor 16 runs along a segment of a circle with the center at the rotational axis R, for example over an angular range of 180° so that the input 22 and the output 24 are on a straight line with the rotational axis R.

The active section 36 and the passive section 38 are likewise arranged one after the other in the peripheral direction of the shifting device 20 with a radial distance to the rotational axis R corresponding to the radius of the delay section 25.

As can be seen in FIG. 11, the subcomponents 34 of the compensation component 32 correspond to slices of the shifting device spaced apart by slits extending in the radial direction so that the distance D between the subcomponents 34 is realized.

The distance D between a pair of adjacent subcomponents 34 may vary between different pairs of subcomponents 34 or is the same for all pairs of subcomponents.

By rotating the shifting device 20, the portion of the active section 36 overlapping with the delay section 25 can be adjusted as the delay section 25 does not extend over a full circle.

The shifting device 20 may be, for example, a disk.

Using a rotatable shifting device 20 further reduces the size of the phase shifter assembly 12.

A second major difference to the previous embodiments is apparent from FIG. 12. The shifting device 20 of this embodiment is made from a single material, for example by injection molding. The material may be the dielectric material of the dielectric component 30. Only in the passive section 38 the solid material comprises a recess in which the compensation component 32 is arranged.

This design simplifies the manufacturing of the shifting device 20 significantly.

Even though only a shifting device 20 according to the first embodiment of FIGS. 1 and 2 is shown, the rotational shifting device 20 may also be of the structure of the second embodiment shown in FIG. 3.

Figure 13:
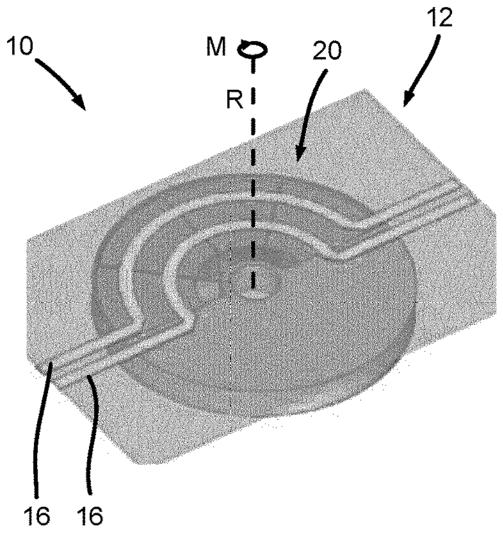
FIGS. 13-16: very schematic drawings of parts of an antenna according to a ninth, tenth, eleventh and twelfth embodiment of the invention, respectively, with a phase shifter assembly according to a ninth, tenth, eleventh and twelfth embodiment of the invention, respectively.

FIG. 13 shows a ninth embodiment of an antenna 10 with the phase shifter assembly 12 corresponding to the eighth embodiment shown in FIGS. 11 and 12.

In this ninth embodiment, two signal conductors 16 are provided which run parallel to each other in the same plane. The plane of the signal conductor 16 is perpendicular to the first direction F.

Parallel with respect to the direction of motion M means that both delay sections 25 run on circles centered around the axis of rotation R, wherein one of the circles of the delay section 25 has a smaller radius than the other with respect to the axis of rotation R.

Figure 14:
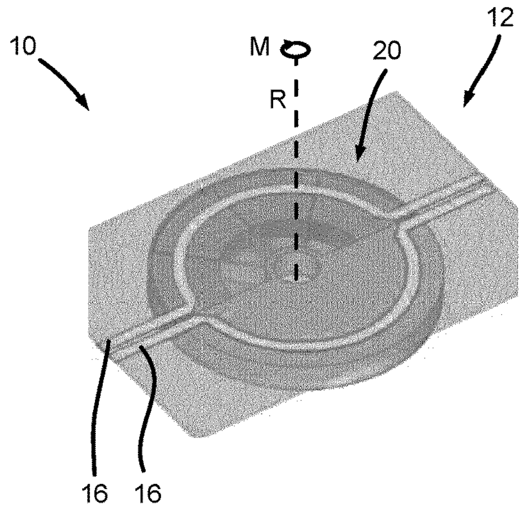

FIG. 14 shows a tenth embodiment of an antenna 10 with a phase shifter assembly 12 which corresponds to the ninth embodiment. The difference to the ninth embodiment being that the two signal conductors 16 have delay sections 25 running antiparallel. Thus, the delay section 25 of one of the signal conductor 16 runs clockwise around the axis of rotation R, the delay section 25 of the other one of the signal conductors 16 runs counterclockwise around the axis of rotation R.

In particular, the radius of the delay sections 25 with respect to the axis of rotation R are the same.

This way, a rotational differential phase shifter is provided.

Figure 15:
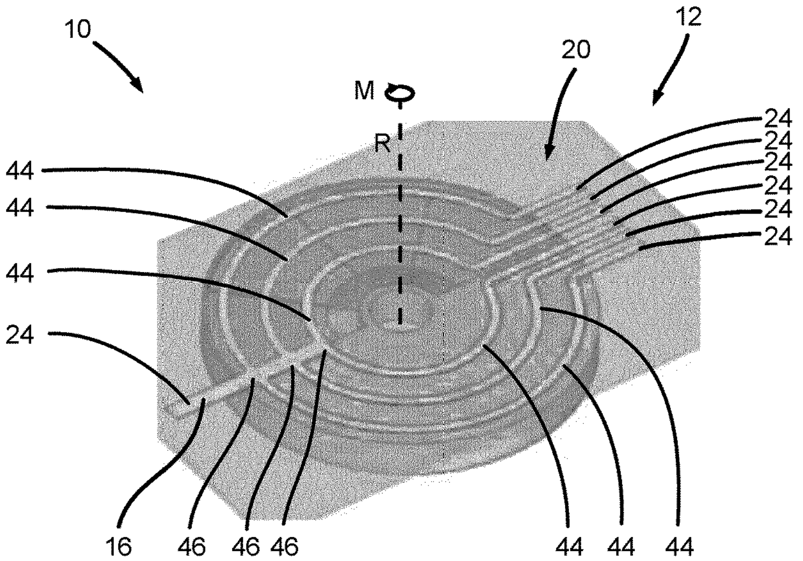

FIG. 15 shows an eleventh embodiment of an antenna 10 with a phase shifter assembly 12 corresponding a combination of the ninth and tenth embodiment.

In this eleventh embodiment, the signal conductor 16 comprises one input portion 42, three junctions 46 and six branch portions 44.

The input portion 42 runs radially and two branch portions 44 extend from each junction 46 in opposite peripheral directions.

The two branch portions 44 extending from the same junction 46 form a pair of branch portions 44 running other around the axis of rotation R on sections of circles with the same radius but antiparallel to each other.

The three pairs of branch portions 44 run on sections of circles having different radii.

At the opposite end of the input portion 42, the branch portions 44 run in straight lines parallel to each other and parallel to the input portion 42.

Thus, the phase shifter assembly 12 of the eleventh embodiment is a differential radial phase shifter with one input 22 and six outputs 24.

Of course, phase shifter assembly 12 with only two or four or even more than six outputs 24 can be constructed based on this embodiment. In this case, only one, two or more than three junctions 46, respectively, are necessary.

Figure 16:
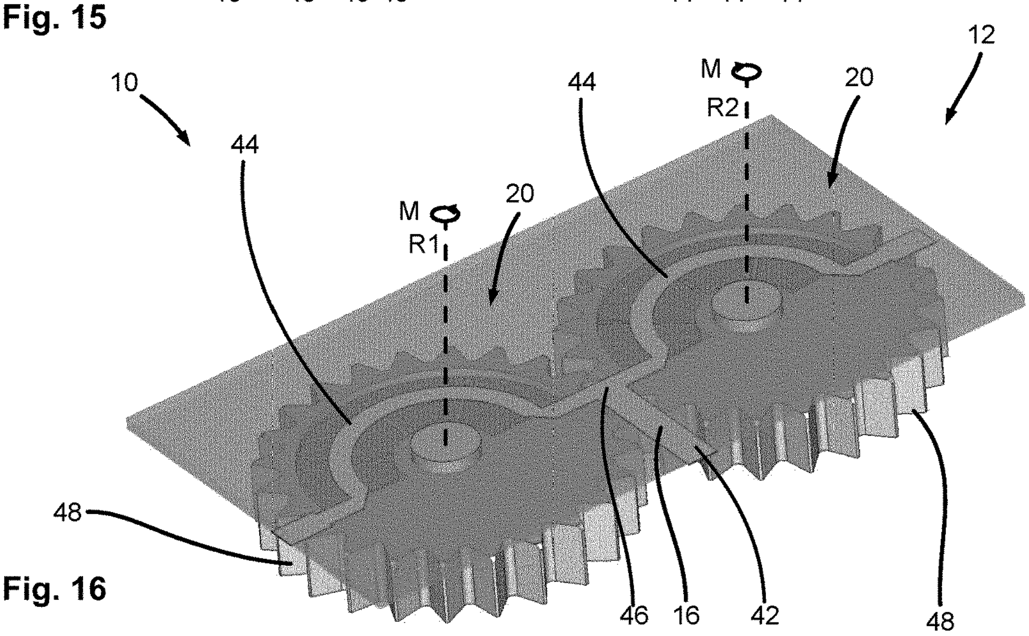

FIG. 16 shows a twelfth embodiment of an antenna 10 with a phase shifter assembly 12.

In this embodiment, two shifting devices 20 according to the eighth embodiment of FIG. 11 are provided. The shifting devices 20 are rotatable around different but parallel axes of rotation R1, R2.

In contrast to the eighth embodiment, the shifting devices 20 have a toothed outer periphery 48, which are engaging with one another. Thus, a rotation of one of the shifting devices 20 leads to a rotation of the other one of the shifting devices 20 in the opposite direction.

The signal conductor 16 has an input portion 42 branching into two branch portions 44 at a junction 46. The input portion 42 extends in a region between the two shifting devices, more precisely in the region where the toothed outer peripheries 48 of the two shifting devices 20 engage with one another.

In the shown embodiment, the junction 46 is located between the two axes of rotation R1, R2, in particular on a straight line connecting both axes of rotation R1, R2.

Starting from the junction 46, the branch portions 44 extend in opposite directions, in particular radially towards each one of the axes of rotation R1, R2.

In the region of the shifting devices 20, each branch portion 44 corresponds to the signal conductor 16 of the respective shifting device according to the embodiment of FIG. 11.

The location of the active section 36 and the passive section 38 of both shifting devices 20 correspond to each other such that the overlap of the active section 36 with the respective delay section 25 has the same size for both shifting devices 20 at any given position.

With this construction, a phase shifter assembly 12 with one input 22 and two outputs 24 is realized, wherein the radiofrequency signals at the outputs 24 do not comprise a phase shift with respect to one another.

Further, the features of the individual embodiments described above may be of course be combined freely.

In particular, the designs of the shifting device 20 of the first embodiment shown in FIG. 2 and the second embodiment shown in FIG. 3 can be equally applied to any of the other embodiments shown thereafter.

Likewise, the design of the shifting device 20 of FIGS. 8 to 11 can be applied to any of the other embodiments.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A phase shifter assembly for radio frequency signals, the phase shifter assembly having a signal conductor, a ground conductor spaced apart from the signal conductor in a first direction and a shifting device, the shifting device being movable with respect to the signal conductor in and against a direction of motion, the shifting device comprising at least one active section having a dielectric component and at least one passive section having a compensation component, the active section and the passive section being arranged one after the other in the direction of motion, the phase shifter assembly having a first impedance in the active section of the shifting device and a second impedance in the passive section of the shifting device, the first impedance corresponding to the second impedance, the compensation component being spaced apart from the signal conductor in the first direction.

2. The phase shifter assembly according to claim 1, wherein the thickness of the dielectric component in the first direction is larger than the thickness of the compensation component in the first direction.

3. The phase shifter assembly according to claim 1, wherein the compensation component comprises at least two subcomponents which are spaced apart from one another in the direction of motion.

4. The phase shifter assembly according to claim 3, wherein one or both of:

- the distance between the subcomponents in the direction of motion is smaller than a quarter, in particular an eighth of the smallest wavelength of the signals within the frequency band of the phase shifter assembly; and
- the length of the subcomponents in the direction of motion is smaller than half, in particular a quarter of the wavelength of the smallest wavelength of the signals within the frequency band of the phase shifter assembly.

5. The phase shifter assembly according to claim 1, wherein the signal conductor and the ground conductor are provided on opposite sides of a support, in particular wherein the signal conductor and the ground conductor form a microstrip line.

6. The phase shifter assembly according to claim 1, wherein the phase shifter assembly comprises a first ground conductor and a second ground conductor, wherein the signal conductor is arranged between the first and second ground conductor in the first direction, wherein the signal conductor and the first and second ground conductors form a stripline.

7. The phase shifter assembly according to claim 6, wherein one or both of the first ground conductor and the second ground conductor is stationary with respect to the signal conductor or movable with respect to the signal conductor, in particular being a part of the shifting device.

8. The phase shifter assembly according to claim 6, wherein the dielectric component in the active section and the compensation component in the passive section are arranged between the signal conductor and the first ground conductor or between the signal conductor and the second ground conductor.

9. The phase shifter assembly according to claim 1, wherein the active section of the shifting device comprises a first dielectric component and a second dielectric component, wherein the passive section of the shifting device comprises a first compensation component and a second compensation component, wherein the first dielectric component and the first compensation component are arranged between the signal conductor and the ground conductor, in particular the first ground conductor, and wherein the second dielectric component and the second compensation component are arranged on the opposite side of the signal conductor than the first dielectric component and the first compensation component, in particular between the signal conductor and the second ground conductor.

10. The phase shifter assembly according to claim 1, wherein the signal conductor comprises a delay section extending in the direction of motion, wherein the at least one active section and the at least one passive section cover the delay section over its entire length, in particular in any position of the shifting device.

11. The phase shifter assembly according to claim 1, wherein the shifting device comprises two active sections and one passive section, wherein the passive section is located between the active sections in the direction of motion, or in that the shifting device comprises two passive sections and one active section, wherein the active section is located between the passive sections in the direction of motion.

12. The phase shifter assembly according to claim 1, wherein the signal conductor comprises an input portion and at least two branch portions emerging from the input portion at a junction, in particular in the delay section, in particular wherein the branch portions extend from the junction in opposite directions in the direction of motion.

13. The phase shifter assembly according to claim 12, wherein the junction is provided as a Wilkinson power splitter comprising two arms and a resistor, wherein the arms extend from the input portion and are connected to one of the branch portions each, and wherein the resistor, which galvanically couples the arms at the point or region the arms merge with the respective branch portion.

14. The phase shifter assembly according to claim 1, wherein the phase shifter assembly comprises two signal conductors, the signal conductors being aligned parallel or antiparallel with respect to the direction of motion.

15. The phase shifter assembly according to claim 1, wherein the shifting device is configured to move linearly and the direction of motion being a straight line.

16. The phase shifter assembly according to claim 1, wherein the shifting device is configured to rotate around an axis of rotation in the first direction and the direction of motion being the peripheral direction around the axis of rotation.

17. The phase shifter assembly according to claim 1, characterized in that the phase shifter assembly comprises at least two shifting devices, wherein the shifting devices are mechanically coupled such that the shifting devices move simultaneously, in particular synchronously in the same or in opposite directions.

18. The phase shifter assembly according to claim 1, wherein one or both:

the subcomponents, are made out of a conductive material; and the compensation component is coupled to one or both of the ground conductor and the signal conductor galvanically or capacitively.

19. The phase shifter assembly according to claim 1, the shifting device comprises a non-conductive support body, and wherein the subcomponents, are provided as a thin layer of conductive material applied the support body.

20. The phase shifter assembly according to claim 19, wherein one or both of the compensation component and each of the subcomponents are formed by two layers of conductive material on opposite sides of the support body, wherein the two layers may be connected by at least one via extending through the support body, wherein the via is at the border of the respective subcomponent in the direction of motion.

21. The phase shifter assembly according to claim 1, wherein the shifting device comprises a non-conductive support body, wherein the support body holds the dielectric component.

22. An antenna comprising at least one phase shifter assembly and at least one connection line, the phase shifter assembly comprising:

a signal conductor, a ground conductor spaced apart from the signal conductor in a first direction and a shifting device, the shifting device being movable with respect to the signal conductor in and against a direction of motion, the shifting device comprising at least one active section having a dielectric component and at least one passive section having a compensation component, the active section and the passive section being arranged one after the other in the direction of motion, the phase shifter assembly having a first impedance in the active section of the shifting device and a second impedance in the passive section of the shifting device, the first impedance corresponding to the second impedance, the compensation component being spaced apart from the signal conductor in the first direction; and at least one connection line is galvanically connected to the signal conductor of the phase shifter assembly, the impedance of the at least one connection line corresponding to the first and second impedance of the phase shifter assembly.

* * * * *